(12) United States Patent
Wolfe, Jr. et al.

(10) Patent No.: US 9,596,829 B2
(45) Date of Patent: Mar. 21, 2017

(54) ANIMAL TREAT DELIVERY SYSTEMS AND METHODS

(71) Applicants: Jerry J. Wolfe, Jr., Hutto, TX (US); Harold Keith Benson, Hutto, TX (US)

(72) Inventors: Jerry J. Wolfe, Jr., Hutto, TX (US); Harold Keith Benson, Hutto, TX (US)

(73) Assignee: Triple Crown Dog Academy, Inc., Hutto, TX (US)

( * ) Notice: Subject to any disclaimer, the term of this patent is extended or adjusted under 35 U.S.C. 154(b) by 180 days.

(21) Appl. No.: 14/668,427

(22) Filed: Mar. 25, 2015

(65) Prior Publication Data

US 2016/0278342 A1 Sep. 29, 2016

(51) Int. Cl.
*A01K 29/00* (2006.01)
*A01K 15/02* (2006.01)

(52) U.S. Cl.
CPC .................. *A01K 15/025* (2013.01)

(58) Field of Classification Search
CPC .... A01K 15/026; A01K 15/02; A01K 15/025; A01K 5/0233; A01K 5/0275; A01K 5/0114
USPC ... 119/51.01, 707, 709, 710, 711, 702, 53.5, 119/54, 61.4, 61.55
See application file for complete search history.

(56) References Cited

U.S. PATENT DOCUMENTS

| | | | |
|---|---|---|---|
| 5,343,828 A | 9/1994 | Houghton et al. | |
| 5,758,604 A * | 6/1998 | Jørgensen | A01K 15/025 119/711 |
| 5,819,690 A | 10/1998 | Brown | |
| 6,073,581 A | 6/2000 | Wang | |
| 6,098,571 A | 8/2000 | Axelrod et al. | |
| 6,158,390 A | 12/2000 | Holtier et al. | |
| 6,237,538 B1 | 5/2001 | Tsengas | |
| 6,484,671 B2 | 11/2002 | Herrenbruck | |
| 6,557,496 B2 | 5/2003 | Herrenbruck | |
| 7,367,283 B2 | 5/2008 | Aboujaoude et al. | |
| 7,600,488 B2 | 10/2009 | Mann | |
| 7,640,894 B2 | 1/2010 | Jager | |
| 7,866,281 B2 | 1/2011 | Willinger | |
| D632,027 S | 2/2011 | Johnston et al. | |
| 8,225,747 B2 | 7/2012 | Markham et al. | |
| 8,474,404 B2 | 7/2013 | Costello | |
| 8,584,620 B2 | 11/2013 | Rutherford et al. | |
| 8,640,647 B2 | 2/2014 | Dotterer | |

(Continued)

*Primary Examiner* — Trinh Nguyen
(74) *Attorney, Agent, or Firm* — Russell Ng PLLC; Brian F. Russell (57) ABSTRACT

An animal treat delivery system includes a multi-part body having an interior volume and baffle portions within the body that divide the interior volume of the body into compartments having openings therebetween that facilitate at least indirect communication between the compartments. A first recess is formed in a first part of the body and a second recess is formed in a second part of the body. An exit hole positioned within the first recess communicates with an exit compartment, included within the compartments, such that animal treats within the exit compartment can be discharged from the body via the exit hole. A lever that is integrated in one part of the body includes an end that is externally accessible via one of the recesses and is configured to releasably engage a structure in the other part of the body to facilitate coupling and uncoupling the first and second parts.

20 Claims, 9 Drawing Sheets

(56) References Cited

U.S. PATENT DOCUMENTS

| | | |
|---|---|---|
| 8,746,182 B2 | 6/2014 | Anderson |
| 8,820,268 B2 | 9/2014 | Valle et al. |
| 9,462,787 B2* | 10/2016 | Christianson ........ A01K 15/021 |
| 2002/0106968 A1* | 8/2002 | Herrenbruck ............ A63H 5/00 |
| | | 446/475 |
| 2002/0115377 A1* | 8/2002 | Herrenbruck ............ A63H 5/00 |
| | | 446/475 |
| 2006/0254531 A1 | 11/2006 | Willinger |
| 2007/0022971 A1 | 2/2007 | Renforth et al. |
| 2007/0289553 A1* | 12/2007 | Jager .................... A01K 15/026 |
| | | 119/710 |
| 2008/0083378 A1 | 4/2008 | Pearce |
| 2008/0121190 A1 | 5/2008 | Moulton |
| 2009/0314221 A1 | 12/2009 | Wang |
| 2012/0318210 A1 | 12/2012 | Anderson |
| 2013/0019812 A1 | 1/2013 | Rutherford et al. |
| 2013/0025543 A1 | 1/2013 | Ottosson |
| 2013/0055965 A1 | 3/2013 | Valle et al. |
| 2013/0061816 A1 | 3/2013 | Aboujaoude |
| 2014/0261194 A1 | 9/2014 | Cloutier et al. |
| 2014/0373788 A1* | 12/2014 | Ragonetti ............ A01K 15/025 |
| | | 119/51.01 |

* cited by examiner

ANIMAL TREAT DELIVERY SYSTEMS AND METHODS

BACKGROUND OF THE INVENTION

The present invention relates to articles of manufacture and associated methods, and more specifically, to articles such as pet treats and molded pet toys that function as pet treat delivery systems and associated methods of manufacture and use.

It is well known in the art that boredom is a significant contributor to destructive behavior in domesticated animals. For example, U.S. Pat. No. 6,634,318 to Rucker and the prior art referenced therein discloses that barking, digging and other destructive behaviors are common problem behaviors of canines that become discontented or bored. As further disclosed in these patents, one common approach utilized in the art to address such destructive behaviors in dogs is to provide a toy with which the dog can interact and that encourages such interaction by rewarding the dog. For example, one class of dog toys dispense food (e.g., treats) from a hollow interior cavity through an opening as a dog interacts with the toy. The Rucker dog toy utilized an edible closure, a portion of which extended outside of the toy, to initially prevent treats from escaping through an opening in the toy. As a dog broke the edible closure, the edible closure dislodged from the opening to allow treats to readily exit the Rucker dog toy.

BRIEF SUMMARY

The present disclosure appreciates that pet toys that function as pet treat delivery systems may reduce destructive behavior of a pet only during a time period in which the pet remains interested in the pet toy. The present disclosure also appreciates that a pet may quickly loose interest in a pet toy when the pet toy no longer includes pet treats.

In at least one embodiment, an animal treat delivery system includes a rigid multi-part body having an interior volume and a plurality of baffles within the body. The baffles divide the interior volume of the body into a plurality of compartments each having a respective opening that facilitates at least indirect communication between the compartments. The system includes a first recess formed in a first part of the body and a second recess formed in a second part of the body. The system further includes an exit hole positioned within one of the first and second recesses. The exit hole communicates with an exit compartment among the plurality of compartments, such that articles (e.g., animal digestible treats) within the exit compartment can exit the body via the exit hole. The system further includes a lever integral with one of the parts of the body. The lever has an end that is externally accessible via one of the first and second recesses and is configured to releasably engage a structure in the other part of the body to facilitate coupling and uncoupling the first and second parts.

In various embodiments, the system includes an resilient material (e.g., an elastomer) molded over the body. In at least one embodiment, the body only includes the first and second parts, the first recess is centrally located in the first part, and the second recess is centrally located in the second part.

In another embodiment, each of the baffles is formed of a baffle portion of the first part and a baffle portion of the second part. In an embodiment, one of the baffles is configured such that two of the compartments that are adjacent to each other cannot directly communicate.

In at least one embodiment, the system includes a plurality of entrance holes formed in the first part and a plurality of elongated members formed in the second part. One or more first ones of the elongated members are configured to block associated ones of the entrance holes and a second one of the elongated members is configured to not block an associated one of the entrance holes. In an embodiment, a surface of the first part includes an alignment mark and a surface of the second part includes a plurality of difficulty indicators to indicate a relative degrees of difficulty in discharging articles (e.g., animal digestible treats) from various compartments within the animal treat delivery system.

In yet another embodiment, the system includes a plurality of alignment guides integrated into an interior surface of one part that extend into the other part when the first and second parts are locked. The system may include a limiting structure located proximate the exit hole that is configured to meter discharge of articles from an interior of the body through the exit hole. The limiting structure may, for example, be made of a resilient material, which may be an extension of an overmold through a hole in the body. In at least one embodiment, a central portion of the second part is keyed to receive a central portion of the first part.

DETAILED DESCRIPTION

Disclosed herein are innovative articles, i.e., pet toys that function as pet treat delivery systems, as well as associated methods of manufacture and use. In one embodiment described in detail herein, animal digestible treats are loaded into an interior the pet toy (which has a rigid or semi-rigid multi-part body) or an animal treat delivery system. The general construction of the pet toy serves to increase a time in which animal digestible treats are retained within an interior of the pet toy and, as such, increases the time in which a pet may remain interested in the pet toy.

Figure 1:
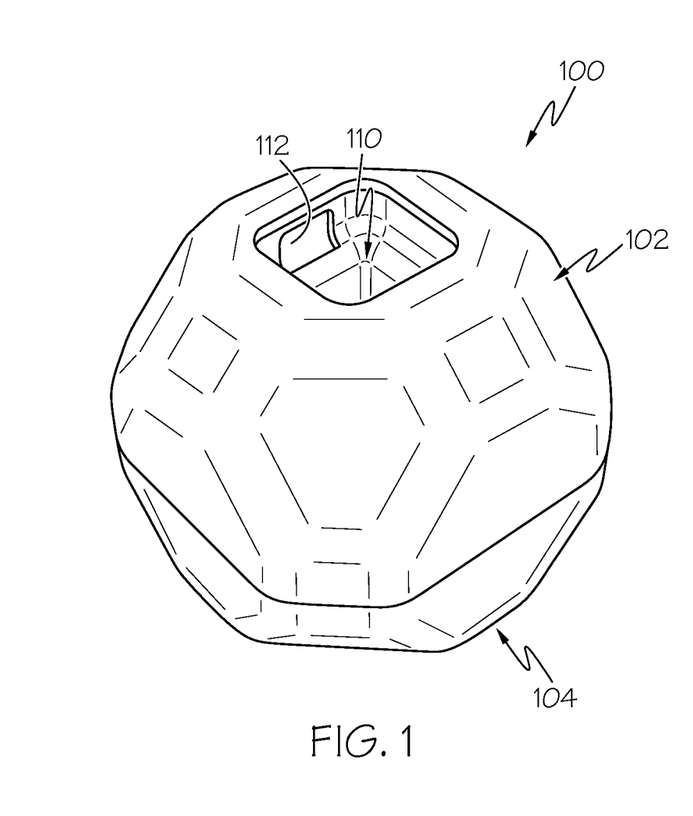
FIG. 1 is a perspective view illustrating a top of an animal treat delivery system (having a rigid multi-part body) that includes a first recess (formed in a first part of the body) with an exit hole that is configured to allow an animal digestible treat within the body to exit the body in accordance with one embodiment.
Figure 2:
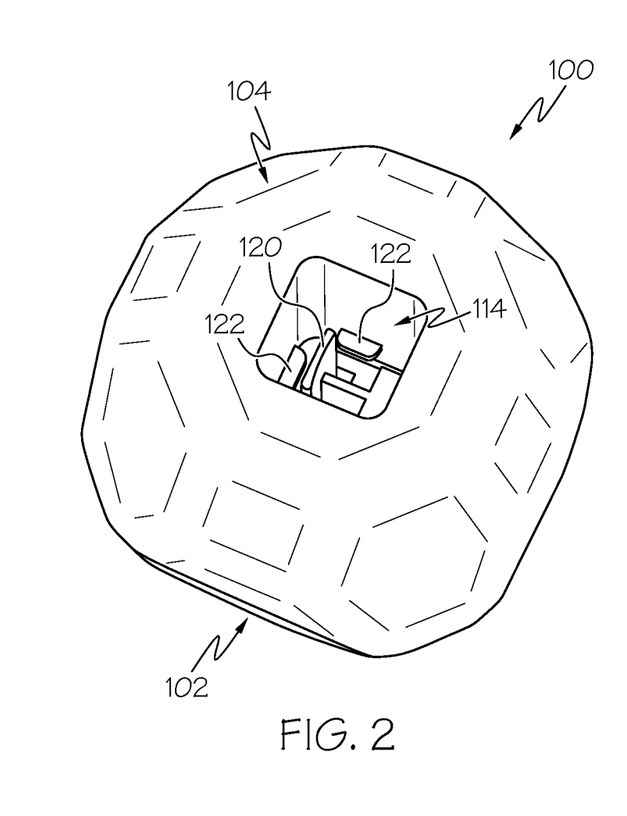
FIG. 2 is a view of a bottom of the animal treat delivery system of FIG. 1 further illustrating a second recess that is formed in a second part the body.
Figure 4:
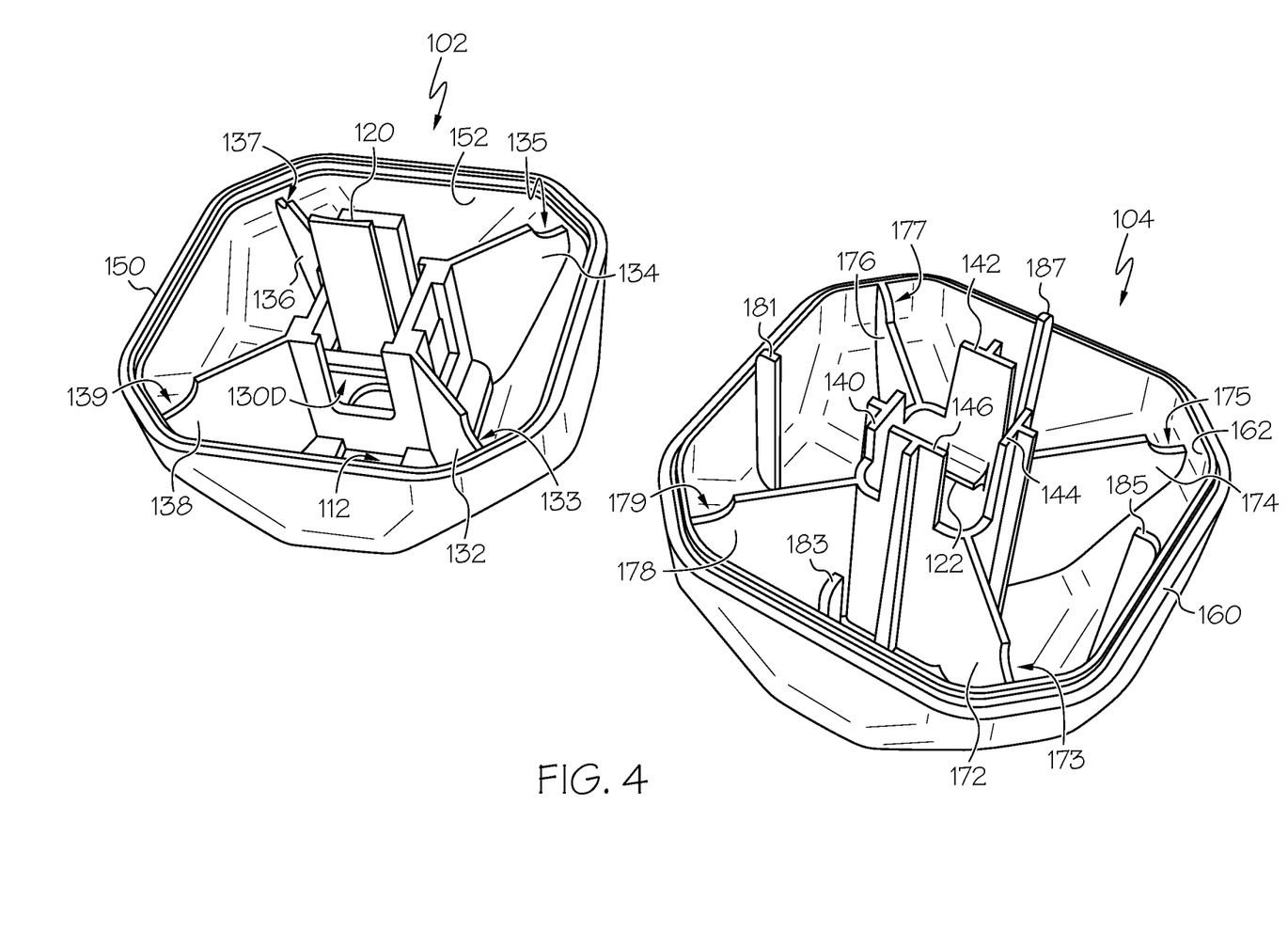
FIG. 4 is a view of the animal treat delivery system of FIG. 1 with the first part and the second part of the body disassembled.

With reference now to the figures, and with particular reference to FIGS. 1 and 2, an animal treat delivery system 100 is illustrated that is configured according to one embodiment of the present disclosure. Animal treat delivery system 100 includes a multi-part body, which in this embodiment has the overall form of a faceted ball. In other embodiments, animal treat delivery system may have a different overall form, including, for example, a rounded, ovoid, cylindrical, elliptical, pyramidal, rectangular prism, or irregular form. In one or more embodiments, the body of animal treat delivery system 100 can be molded from a rigid or semi-rigid material, such as nylon or acrylonitrile butadiene styrene (ABS). As best seen in FIG. 4, in at least some embodiments, animal treat delivery system 100 may be formed of multiple layers. In such embodiments, the rigid or semi-rigid material can form an inner layer 152, 162, and animal treat delivery system 100 may additionally include an outer layer 150, 160, which may be formed of an resilient material. In one preferred embodiment, outer layer 150, 160 is formed of an elastomeric material, such as thermoplastic elastomer (TPE).

In the illustrated embodiment, the multi-part body of animal treat delivery system 100 includes only two parts, namely, a first part 102 and a second part 104, which each can be (but are not required to be) approximately half of the overall form. First part 102 of the body includes a centrally located first recess 110 formed therein, and second part 104 of the body has a centrally located second recess 114 formed therein. In at least one embodiment, when the multi-part body is assembled, recesses 110 and 114 are co-linear. First recess 110 and second recess 114 can be (but are not required to be) substantially the same size. As one example, animal treat delivery system 100 may have an outer diameter of about 125 millimeters, first recess 110 may have a diameter of about 40 millimeters, and second recess 114 may have a diameter of about 30 millimeters, where such dimensions may vary, for example, plus or minus 5 millimeters.

As indicated in FIG. 1, first part 102 includes an exit hole 112 within first recess 110 that is configured to allow an article within the body, such as an animal digestible treat, to exit the body. As further illustrated, for example, in FIGS. 2, 5 and 10, a lever 120 in one of first and second recesses 110, 114 (which in this embodiment is a component of first part 102) extends into the other of first and second recesses 110, 114 to releasably interlock with a rib structure 122 (which in this embodiment is a component of second part 104) to releasably couple first part 102 and second part 104. In this manner, parts 102, 104 of animal treat delivery system 100 can be disassembled by application of only manual force to lever 120, and then reassembled by application of manual force to engage a tooth (or detent) of lever 120 with rib structure 122. By virtue of the configuration of animal treat delivery system 100 having lever 120 disposed within recesses 110, 114, animal treat delivery system 100 can be readily assembled and disassembled by a human, but cannot be readily assembled and disassembled by an animal (e.g., a dog) lacking the ability and/or dexterity to manipulate lever 120.

Figure 3:
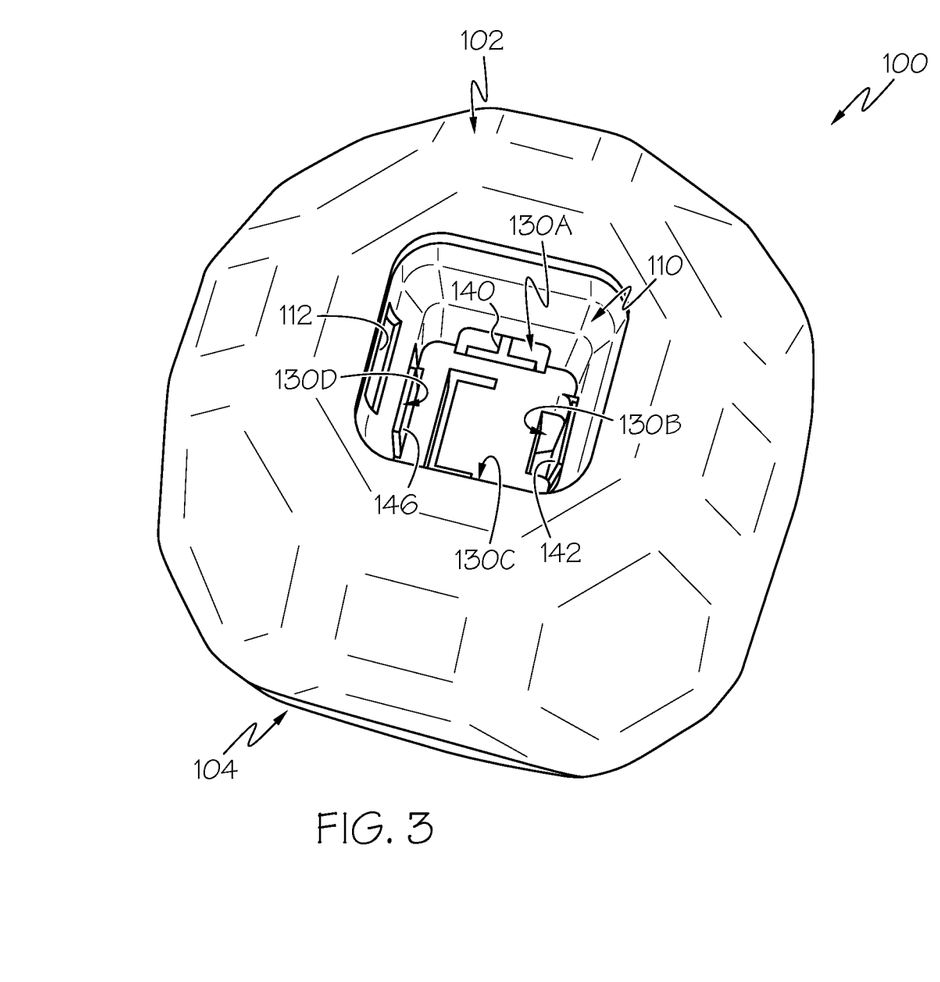
FIG. 3 is another view of the top of the animal treat delivery system of FIG. 1 that further illustrates a relationship between entrance holes formed in the first part of the body and the exit hole in accordance with another embodiment.

With additional reference now to FIGS. 3-4, which respectively provide a more detailed view of aperture 110 and a disassembled view of animal treat delivery system 100, additional components of animal treat delivery system 100 can be seen. As is partially illustrated, in some embodiments, recess 110 of first part 102 may include one or more (and in this embodiment, four) entrance holes 130A, 130B, 130C, and 130D, in addition to exit hole 112. Second part 104 can additionally include a corresponding number of elongated members 140, 142, 144, or 146 formed integrally with a core defining second recess 114. When animal treat delivery system 100 is assembled, entrance holes 130A-130D, elongated members 142-146 block corresponding ones of entrance holes 130A-130D, but elongated member 140 (which is shorter) does not block one of entrance holes 130A-130D, thus permitting an article, such as an appropriately sized animal digestible treat, to be loaded into an interior volume of animal treat delivery system 100. In the particular example shown in FIG. 3, entrance hole 130A is not blocked by elongated member 140, as elongated member 140 is shorter than elongated members 142, 144, and 146.

FIG. 4 further illustrates that at least one of (and in the illustrated embodiment, each of) first part 102 and second part 104 includes one or more baffle portions, which when animal treat delivery system 100 is assembled, subdivide the interior volume of animal treat delivery system 100 into multiple compartments. In the illustrated example, first part 102 includes four baffle portions 132, 134, 136 and 138, and second part 104 includes four corresponding baffle portions 172, 174, 176 and 178. Baffle portion 132 includes a notch 133, baffle portion 134 includes a notch 135, baffle portion 136 includes a notch 137, and baffle portion 138 includes a notch 139. Similarly, baffle portions 172, 174 and 178 include notches 173, 175, and 179, respectively, while baffle portion 176 includes a protrusion 177. As is discussed in detail in conjunction with FIG. 10, notches 133, 135, 139, 173, 175, and 179 are sized to allow animal digestible treats to move between the interior compartments of animal treat delivery system 100 defined by the baffle portions as an animal interacts with (e.g., rotates) animal treat delivery system 100. However, in this embodiment, protrusion 177 prevents animal digestible treats from moving between the compartments separated by baffle portions 136, 176.

Figure 9:
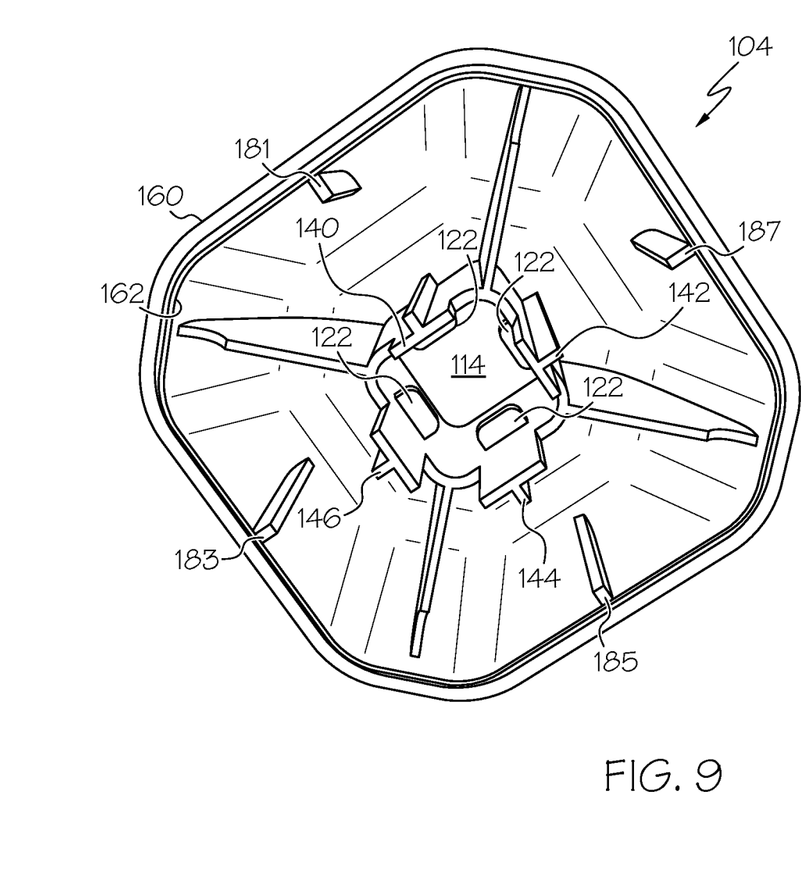
FIG. 9 is an interior view of the second part of the animal treat delivery system of FIG. 1 further illustrating rib structures that facilitate locking the first and second parts.

FIGS. 4 and 9 further illustrates that each of elongated members 140-146 includes an integrally formed rib structure 122 that is configured to releasably engage with a corresponding tooth or detent integrally formed on lever 120 of first part 102. In addition, FIG. 4 further illustrates that one or more of first part 102 and second part 104 (and in this example, second part 104 only) can include alignment guides 181, 183, 185, 187 that extend into the other of parts

102, 104 to facilitate coupling of parts 102, 104. Of course, in various embodiments, more or fewer alignment guides can be used.

Figures 5, 6:
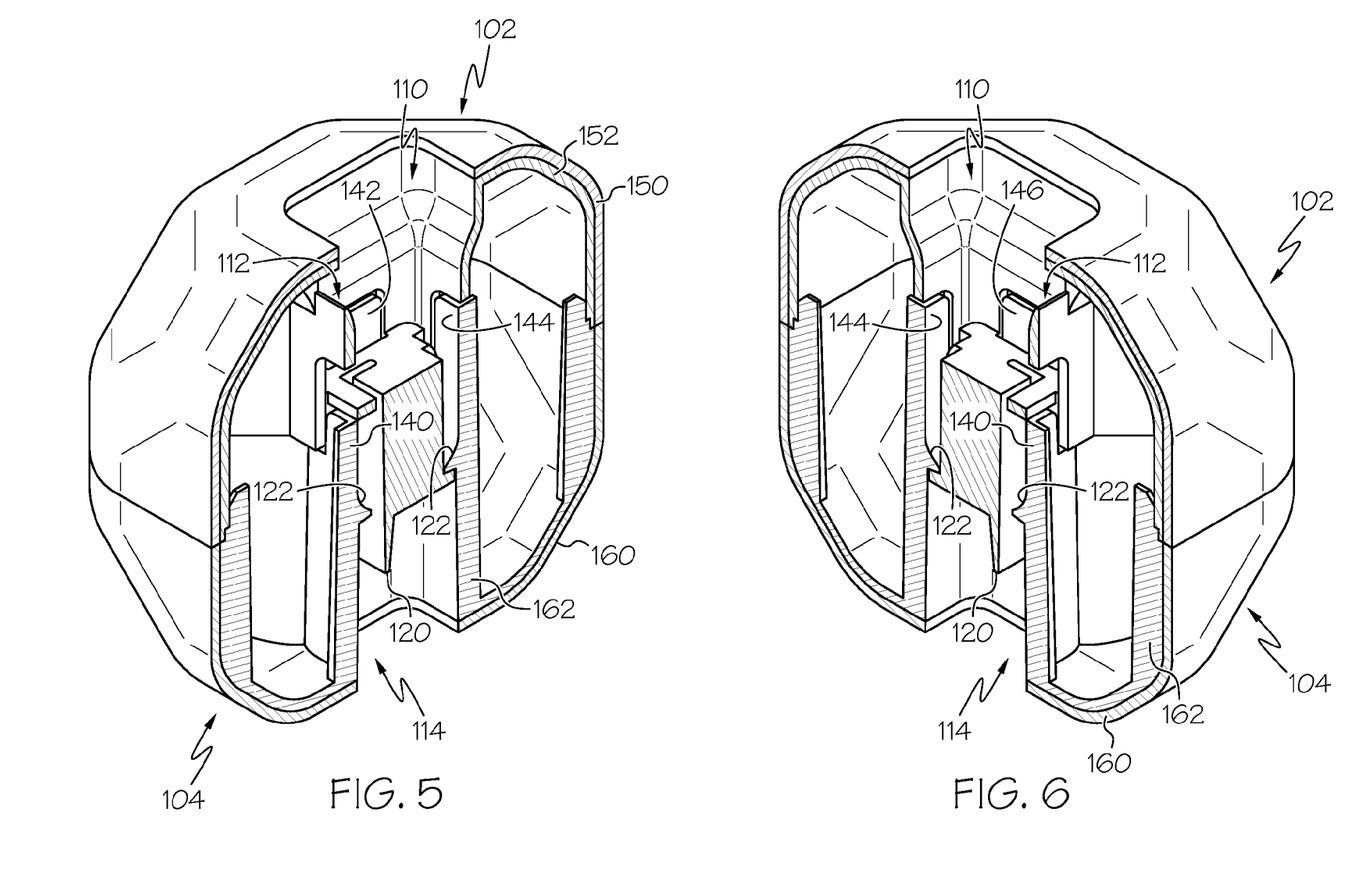
FIGS. 5 and 6 illustrate the animal treat delivery system of FIG. 1 in cross-section.

With additional reference now to FIGS. 5 and 6, an animal treat delivery system 100 as assembled is illustrated in cross-section. As assembled, animal treat delivery system 100, includes exit hole 112 and entrance hole 130D opening into a same compartment (i.e., an exit compartment), as elongated member 140 does not block entrance hole 130D (see FIG. 1, where elongated member 146 blocks entrance hole 130D). As is shown, a tooth or detent (and in this example, a tooth) of lever 120 of first part 102 is engaged with rib structure 122 of second part 104, releasably coupling first part 102 with second part 104. To release first part 102 from second part 104, the end of lever 120 is depressed by manual force (to move the tooth on lever 120 away from rib structure 122), and first part 102 may then be separated from second part 104.

Figure 7:
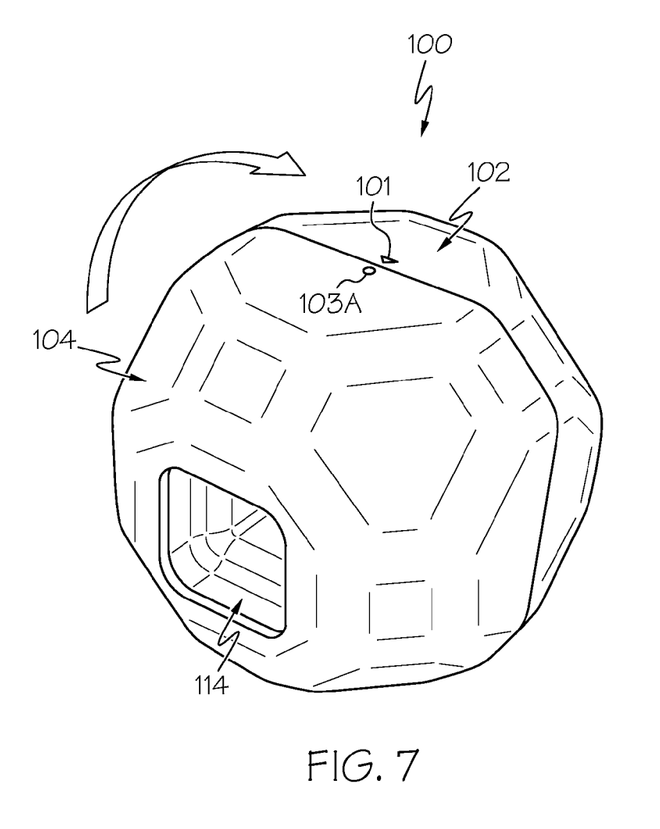
FIG. 7 is a perspective view of the animal treat delivery system of FIG. 1 in which an outer surface of the first part includes an alignment mark and an outer surface of the second part includes a plurality of difficulty indicators (in this case one bump indicates that any treat entering an interior of the body through an entrance hole is retained in an exit compartment that includes the exit hole)
Figure 8:
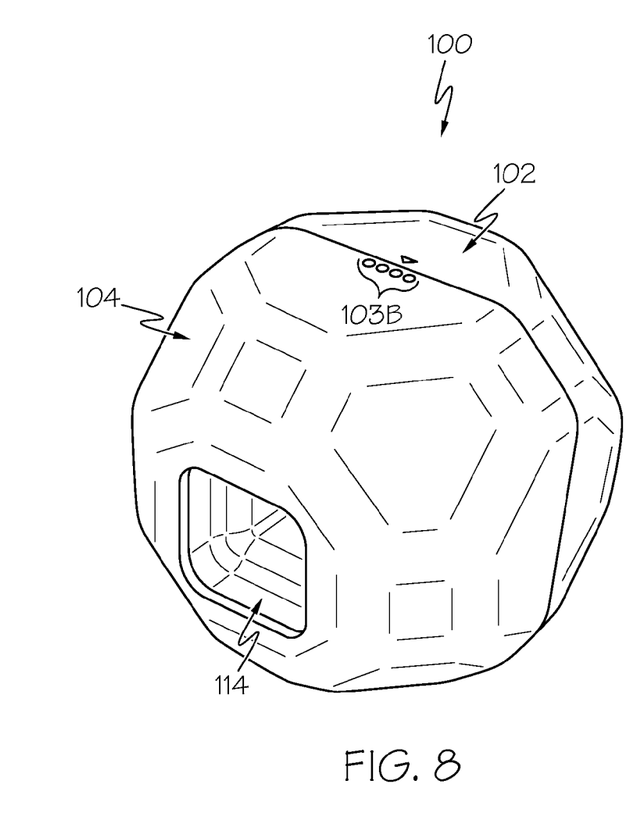
FIG. 8 is a perspective view of the animal treat delivery system of FIG. 1 in which an outer surface of the first part includes an alignment mark and an outer surface of the second part includes a plurality of difficulty indicators (in this case four bumps indicate that any treat entering an interior of the body through an entrance hole is retained in a compartment that requires the farthest travel to reach an exit compartment that includes the exit hole)

With additional reference to FIGS. 7-8, animal treat delivery system 100 is illustrated as including an alignment mark 101 on an outer surface of first part 102 and one or more difficulty indicators 103 on an outer surface of second part 104. Difficulty indicator(s) 103 indicates a difficulty a pet should have in causing animal digestible treats to be discharged from animal treat delivery system 100. That is, difficulty indicator(s) 103 provides an indication of which internal compartment an animal digestible treat that is being deposited through an entrance hole will enter. Registration of alignment mark 101 with a difficulty indicator 103 comprising one bump indicates a lower difficulty, as any animal digestible treat inserted through an entrance hole 130 is retained in a same interior compartment that includes the exit hole 112. However, as shown in FIG. 8, registration of alignment mark 101 with a difficulty indicator 103 comprising four bumps indicates a higher difficulty in that any animal digestible treat inserted in an open entrance hole 130 will have to transition through all interior compartments before being discharged from exit hole 112. Thus, by selectively coupling first part 102 and second 104 in different rotational orientations, a human user can set the difficulty in discharging animal digestible treats from animal treat delivery system 100 at a desired level of difficulty.

Figure 10:
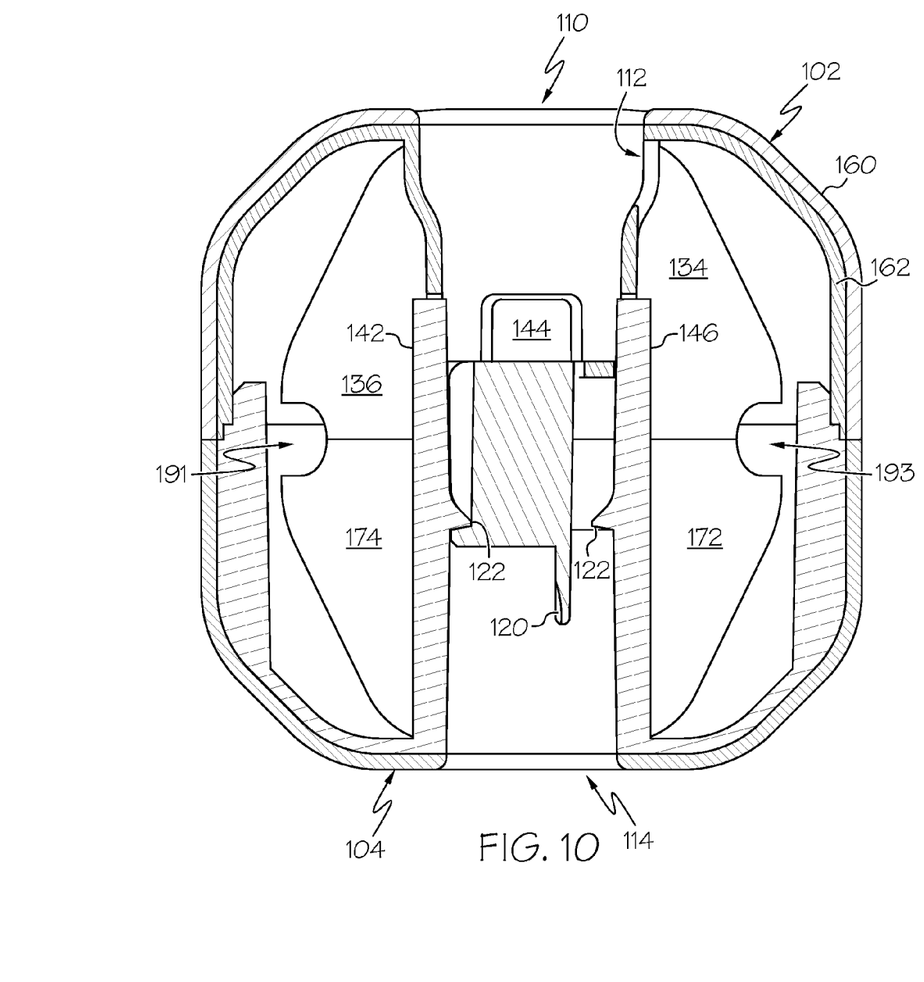
FIG. 10 is a cross-section of the animal treat delivery system of FIG. 1 which further illustrates baffle portions in an interior volume of the body and the interlocking of a lever formed in the first part of the body with a rib structure formed in the second part of the body.

Referring additionally now to FIG. 10, another cross-sectional view of an assembled animal treat delivery system 100 is given to further illustrate two baffles. A first baffle includes baffle portion 174 of second part 104 and baffle portion 136 of first part 102. A second baffle includes baffle portion 172 of second part 104 and baffle portion 134 of first part 102. Passage 191 is defined by notches 137 and 175, and passage 193 is defined by notches 135 and 173. The first and second baffles define one side of different compartments. In one embodiment, animal treat delivery system 100 includes four interior compartments defined by four baffle portions. Again, it should be appreciated that an animal treat delivery system configured according to the present disclosure may include more or less than four compartments. For example, an animal treat delivery system with three baffles would include three compartments and an animal treat delivery system with two baffles would include two compartments.

While animal treat delivery system 100 has been described as including one or more entrance holes for loading animal digestible treats, it should be appreciate that such entrance hole(s) can be omitted in some embodiments. In such embodiments, the first part and second part may disassembled to permit treats to be directly loaded into the interior of the animal treat delivery system.

Figure 11:
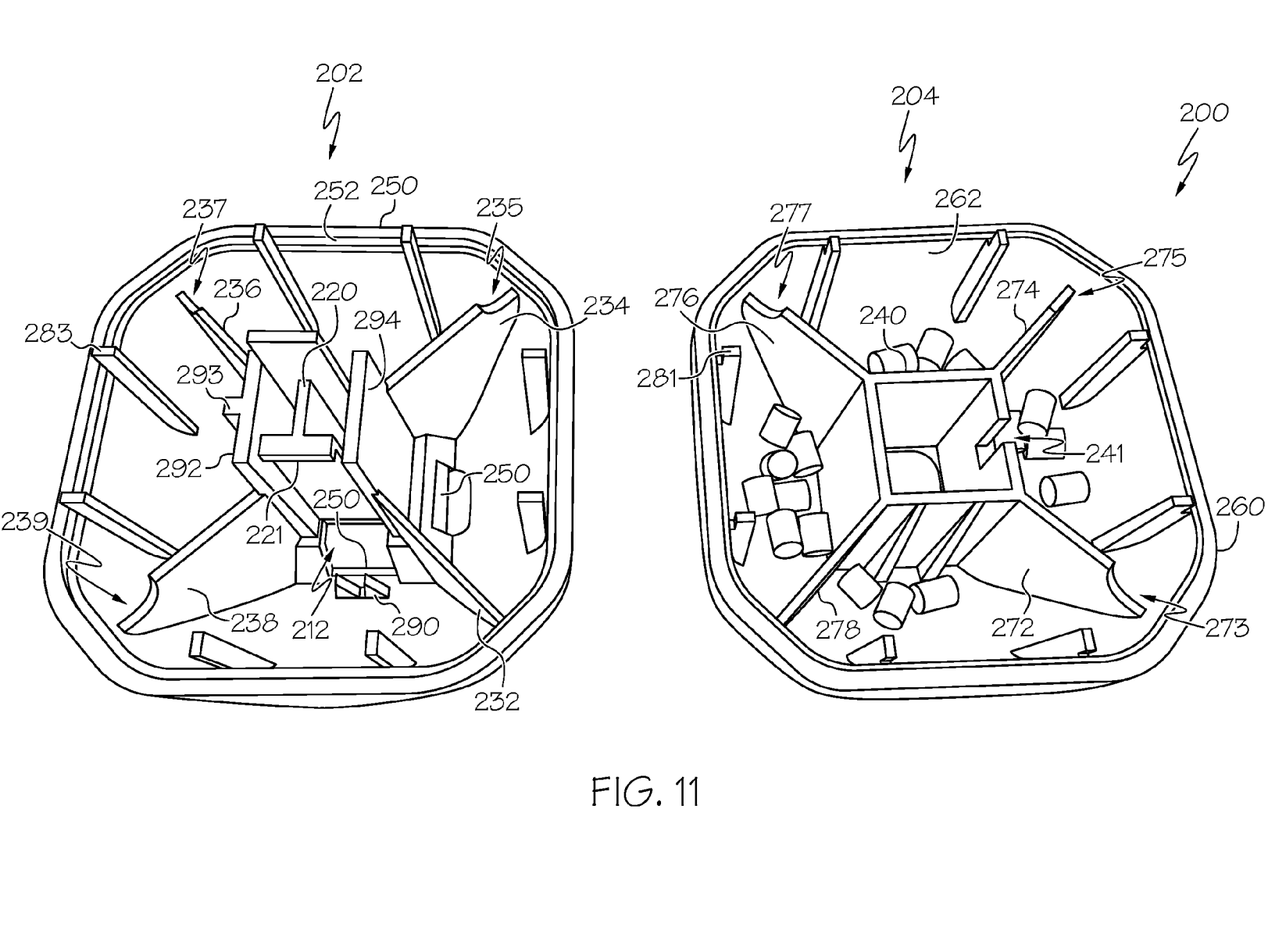
FIG. 11 is a view of an animal treat delivery system (having a rigid multi-part body) with a first part and a second part of the body disassembled, in accordance with another embodiment.

With reference now to FIG. 11, there is illustrated an animal treat delivery system 200 that omits entrance hole(s) in accordance with one embodiment. In this example, animal treat delivery system 200 is constructed similarly to animal treat delivery system 100 as previously described, with some differences that will become apparent upon reference to the figures and corresponding description.

Animal treat delivery system 100 includes a multi-part body, which in this embodiment again has the overall form of a faceted ball. In other embodiments, animal treat delivery system may have a different overall form, including, for example, a rounded, ovoid, cylindrical, elliptical, pyramidal, rectangular prism, or irregular form. In one or more embodiments, the body of animal treat delivery system 100 can be molded from a rigid or semi-rigid material, such as nylon or acrylonitrile butadiene styrene (ABS). In at least some embodiments, animal treat delivery system 100 may be formed of multiple layers. In such embodiments, the rigid or semi-rigid material can form an inner layer 252, 262, and animal treat delivery system 100 may additionally include an outer layer 250, 260, which may be formed of an elastomeric material, such as thermoplastic elastomer (TPE).

In the illustrated embodiment, the multi-part body of animal treat delivery system 200 includes only two parts, namely, a first part 202 and a second part 204, which are shown disassembled from each other in FIG. 11. First part 202 of the body includes a centrally located first recess formed therein, and second part 204 of the body has a centrally located second recess formed therein, generally as previously described.

First part 202 includes a central portion, including walls 292 and 294 formed integrally with inner layer 252. Wall 292 includes a rib 293. Second part 204 correspondingly includes a central core 240 integrally formed with inner layer 262 of second part 204. Central core 240 includes a slot 241 configured to receive therein a rib 293 formed on wall 292, which is integrally formed on interior surface of inner layer 252 of first part 202. Given the relation of rib 293 and slot 241, first part 202 and second part 204 can only mate in one rotational orientation. (In this example, mating of first part 202 and second part 204 is facilitated by alignment guides 281, 283 integral to both first part 202 and second part 204.)

As discussed above, first part 202 and second part 204 are releasably coupled by a lever 220, which is disposed between walls 292 and 294 and which includes a tooth 221 (or in alternative embodiments, a detent) that is configured to engage a rib structure (not shown) of central core 220 when first part 202 is mated with second part 204. First part 202 further includes an exit hole 212 is through which animal digestible treats 240 are discharged from an interior of animal treat delivery system 200 to an exterior of animal treat delivery system 200.

In the embodiment given in FIG. 11, the interior volume of animal treat delivery system 200 is again subdivided into multiple interior compartments. In particular, first part 202 includes four baffle portions 232, 234, 236, and 238 formed integrally with inner layer 252. As is illustrated, baffle portion 232 does not include a notch, but baffle portions 234, 236 and 238 respectively includes notches 235, 237, and 239. Second portion 204 similarly includes four baffle portions 272, 274, 276, and 278 formed integrally with inner layer 262, where baffle portion 278 does not include a notch, but baffle portions 272, 274 and 276 include notches 273, 275, and 277, respectively. Given this construction, interaction of an animal with an assembled animal treat delivery system 200 can cause animal digestible treats 240 to pass between any of the interior compartments formed by the baffles, except between the compartments formed by baffle portions 276, 278 and 232, 234 and the compartment formed by baffle portions 272, 278 and 232, 238. Thus, a human user may determine the difficulty (and distribution of difficulty) of causing animal digestible treats to be discharged from animal treat delivery system 200 by selecting the interior compartment(s) into which animal digestible treats 240 are initially loaded, as well as the number of animal digestible treats 240 loaded into each such interior compartment. As one use case illustrated in FIG. 11, the human user may elect to place a few animal digestible treats 240 in the interior compartment that communicates directly with exit hole 212 (e.g., to initially incentivize initial animal interaction with animal treat delivery system 200) and distribute the remainder of the animal digestible treats 240 among the other interior compartments (e.g., to incentivize continued animal interaction with animal treat delivery system 200).

Figure 12:
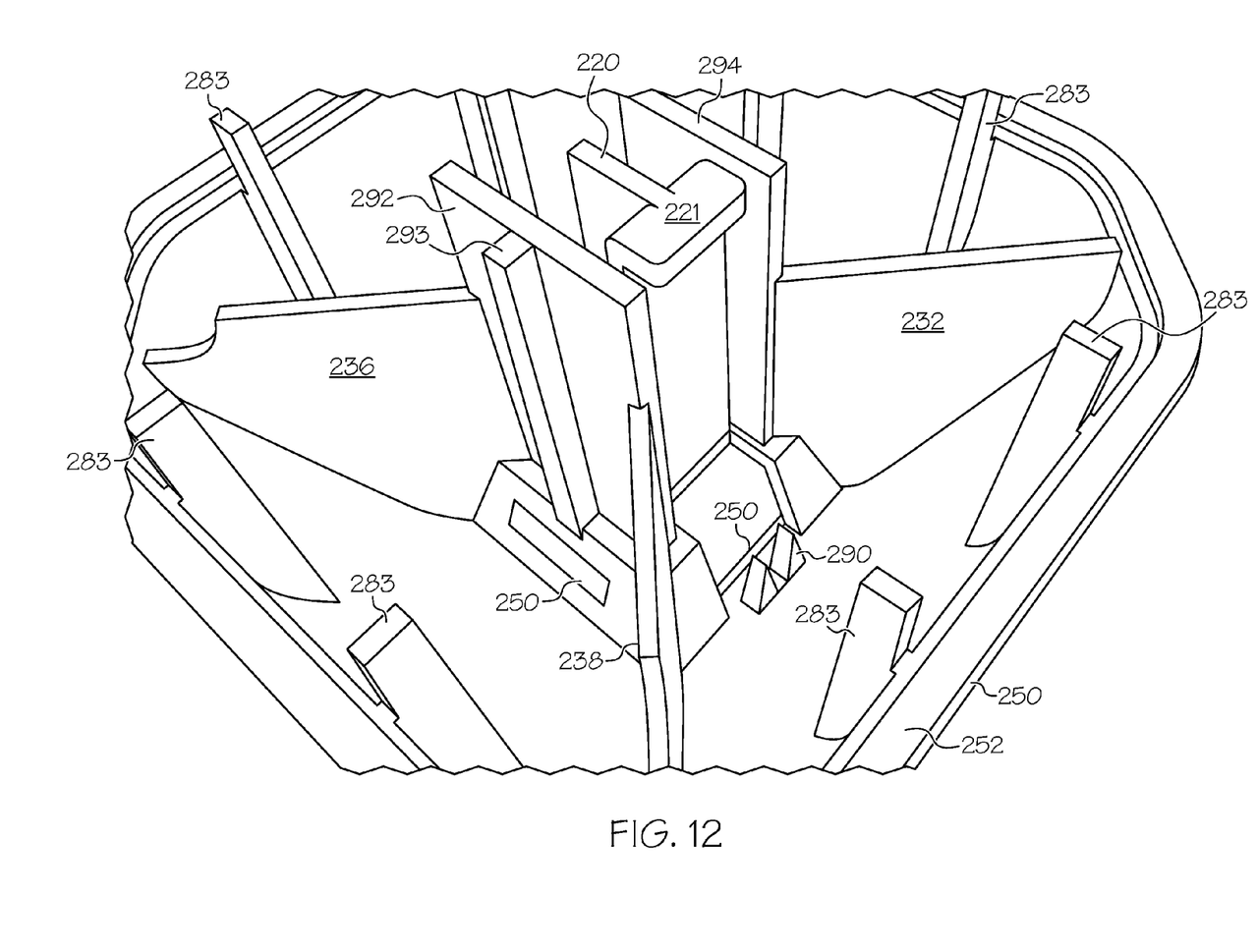
FIG. 12 is a more detailed view of a portion of the first part of the animal treat delivery system of FIG. 11 further illustrating a limiting structure (located proximate an exit hole) that is configured to obstruct articles exiting an interior of the body through the exit hole.

As shown in FIG. 11 but is best seen in the detailed view provided by FIG. 12, in at least some embodiments, a limiting structure 290 may be formed adjacent exit hole 212. Limiting structure 290 serves to meter the discharge of animal digestible treats 240 through exit hole 212. In one preferred embodiment, limiting structure 290 may be formed by permitting an elastomeric material from which outer layer 250 is formed to flow through and fill a hole in inner layer 252, where such a hole is preferably spaced from exit hole 212. As is further illustrated in FIGS. 11-12, either or both of inner layer 252 and inner layer 262 may have one or more additional holes formed there through that are filled by outer layer 250, 260 in order to better maintain adhesion between outer layers 250, 260 on inner layers 252, 262.

Animal treat delivery systems as described herein may be manufactured by injecting a material (e.g., nylon) into a two-part mold to form inner layers and then over-molding an outer layer (e.g., an elastomeric material, such as TPE) over an outer surface of the inner layers. In various embodiments, the two-part mold is configured to form an animal treat delivery system that includes rigid or semi-rigid multi-part body having an interior volume and a plurality of baffle portions within the body. The baffles formed by the baffle portions divide the interior volume of the body into a plurality of compartments having openings therebetween that facilitate at least indirect communication between the compartments. A first recess is formed in a first part of the body, and a second recess is formed in a second part of the body. An exit hole is positioned within the first recess. The exit hole communicates with an exit compartment, included within the compartments, such that articles (e.g., animal digestible treats) within the exit compartment can be discharge from the body via the exit hole. A lever is also integrated in one of the parts of the body. The lever has an end that is externally accessible via one of the recesses and is configured to releasably engage a structure in the other part of the body to facilitate coupling and uncoupling the first and second parts.

In use, a human will load one or more animal digestible treats into the animal treat delivery system and provide the animal treat delivery system to an animal. The animal will then play with the animal treat delivery system causing animal digestible treats to be discharged from the animal treat delivery system, perhaps until all of the animal digestible treats are consumed.

While the present invention has been particularly shown as described with reference to one or more preferred embodiments, it will be understood by those skilled in the art that various changes in form and detail may be made therein without departing from the spirit and scope of the invention. For example, although the present invention has been described with reference to various embodiments of an animal treat delivery system, the present invention as described may also be embodied in other useful articles, such as containers, pet toys, and food dispensers. In addition, it should be appreciated that the dimensions and weights of animal treat delivery systems and their components may differ from those of the disclosed embodiments. With reference to weights and dimensions given herein, the term "about" should be understood as meaning plus or minus ten percent of the stated quantity. Finally, although specific embodiments suitable for use by dogs have been disclosed, it should be appreciated that the disclosed animal treat delivery systems could be employed to deliver treats to animals other than dogs.

What is claimed is:

1. An animal treat delivery system, comprising:
    a multi-part body having an interior volume, the multi-part body including a first part and a second part;
    a first recess formed in a first part of the body and a second recess formed in a second part of the body;
    a plurality of baffles within the body that divide the interior volume into a plurality of compartments each having a respective opening that facilitates at least indirect communication between the plurality of compartments;
    an exit hole positioned within one of the first and second recesses, wherein the exit hole communicates with an exit compartment among the plurality of compartments, such that animal treats within the exit compartment can exit the body via the exit hole; and
    a lever integral with one of the parts of the body, wherein the lever has an end that is externally accessible via one of the recesses and is configured to releasably engage a structure in the other part of the body to permit coupling and uncoupling the first and second parts.

2. The animal treat delivery system of claim 1, further comprising:
    a resilient material molded over the body.

3. The animal treat delivery system of claim 1, wherein the body only includes the first and second parts, and wherein the first recess is centrally located in the first part and the second recess is centrally located in the second part.

4. The animal treat delivery system of claim 1, wherein each of the plurality of baffles is formed of a baffle portion of the first part and a baffle portion of the second part.

5. The animal treat delivery system of claim 1, wherein one of the baffles is configured such that two of the plurality of compartments that are adjacent to each other cannot directly communicate.

6. The animal treat delivery system of claim 1, further comprising:
    a plurality of entrance holes formed in the first part; and
    a plurality of elongated members formed in the second part, wherein one or more first ones of the elongated members are configured to block one or more corresponding ones of the entrance holes and a second one of the elongated members is configured to not block a corresponding one of the entrance holes.

7. The animal treat delivery system of claim 6, wherein a surface of the first part includes an alignment mark and a surface of the second part includes a plurality of difficulty indicators indicating with which of one of the plurality of compartments that a non-blocked one of the plurality of entrance holes is aligned.

8. The animal treat delivery system of claim 1, further comprising:
a plurality of alignment guides integral with one of the first and second parts and extending into the other of the first and second parts when the first and second parts are coupled.

9. The animal treat delivery system of claim 1, further comprising:
a limiting structure located proximate the exit hole and configured to meter discharge of an article from the interior volume of the body through the exit hole.

10. The animal treat delivery system of claim 9, wherein the limiting structure is made of a resilient material.

11. The animal treat delivery system of claim 1, wherein a central core of the second part is keyed to receive a central portion of the first part.

12. The animal treat delivery system of claim 1, wherein:
the lever is integral with the first part; and
the exit hole is formed in the first recess.

13. A pet toy, comprising:
a multi-part body having an interior volume, the multi-part body including a first part and a second part;
a first recess formed in a first part of the body and a second recess formed in a second part of the body;
a plurality of baffles within the body that divide the interior volume into a plurality of compartments each having a respective opening that facilitates at least indirect communication between the plurality of compartments;
an exit hole disposed within the first recess, wherein the exit hole communicates with an exit compartment among the plurality of compartments, such that animal treats within the exit compartment can exit the body via the exit hole; and
a lever integral with the first part of the body, wherein the lever has an end that is externally accessible via the second recess and is configured to releasably engage a structure in the second part of the body to permit coupling and uncoupling the first and second parts.

14. The pet toy of claim 13, further comprising:
a resilient material molded over the body.

15. The pet toy of claim 13, wherein each of the plurality of baffles is formed of a baffle portion of the first part and a baffle portion of the second part.

16. The pet toy of claim 13, further comprising:
a limiting structure located proximate the exit hole and configured to meter discharge of an article from the interior volume of the body through the exit hole.

17. The pet toy of claim 16, further comprising:
a hole through the body; and
a resilient material molded over the body, wherein the limiting structure is formed of an extension of the resilient material extending through the hole.

18. The pet toy of claim 16, wherein a central core of the second part is keyed to receive a central portion of the first part.

19. An animal treat method, comprising:
inserting one or more animal treats into an animal treat delivery system, including:
a multi-part body having an interior volume, the multi-part body including a first part and a second part;
a first recess formed in a first part of the body and a second recess formed in a second part of the body;
a plurality of baffles within the body that divide the interior volume into a plurality of compartments each having a respective opening that facilitates at least indirect communication between the plurality of compartments;
an exit hole positioned within one of the first and second recesses, wherein the exit hole communicates with an exit compartment among the plurality of compartments, such that animal treats within the exit compartment can exit the body via the exit hole; and
a lever integral with one of the parts of the body, wherein the lever has an end that is externally accessible via one of the recesses and is configured to releasably engage a structure in the other part of the body to permit coupling and uncoupling the first and second parts; and
providing the animal treat delivery system to an animal to interact with.

20. The animal treat method of claim 19, wherein:
the animal treat delivery system includes at least one entrance hole; and
the inserting includes inserting the one or more animal treats into the animal treat delivery system via the at least one entrance hole.

* * * * *